United States Patent [19]

Boldebuck et al.

[11] 4,382,126
[45] May 3, 1983

[54] PREPARATION OF AQUEOUS COATING COMPOSITION COMPRISING POLYIMIDE-FORMING REACTANTS

[75] Inventors: Edith M. Boldebuck, Schenectady, N.Y.; Eugene G. Banucci, Pittsfield, Mass.

[73] Assignee: General Electric Company, Schenectady, N.Y.

[21] Appl. No.: 339,953

[22] Filed: Jan. 18, 1982

Related U.S. Application Data

[62] Division of Ser. No. 124,986, Feb. 27, 1980, Pat. No. 4,332,708.

[51] Int. Cl.$^3$ .............................................. C08L 79/08
[52] U.S. Cl. .................................. 524/376; 524/600; 524/755; 524/761; 524/845; 524/879
[58] Field of Search ............... 524/376, 600, 755, 761, 524/845, 879

[56] References Cited

U.S. PATENT DOCUMENTS

| | | | |
|---|---|---|---|
| 3,190,856 | 6/1965 | Lavin et al. | 524/376 |
| 3,347,808 | 10/1967 | Lavin et al. | 524/376 |
| 3,518,219 | 6/1970 | Lavin et al. | 524/376 |
| 3,575,891 | 4/1971 | LeBlanc et al. | 521/189 |
| 4,215,157 | 7/1980 | Boldebuck et al. | 528/208 |
| 4,255,471 | 3/1981 | Boldebuck et al. | 524/376 |

*Primary Examiner*—Harold D. Anderson
*Attorney, Agent, or Firm*—William A. Teoli; James C. Davis, Jr.; James Magee, Jr.

[57] ABSTRACT

Wire coating formulations are provided by heating a mixture of aromatic dianhydride, water and a monoalkyl glycol ether, followed by the addition of organic diamine. The resulting mixture is a stable wire coating enamel capable of forming flexible wire enamels upon cure.

7 Claims, No Drawings

PREPARATION OF AQUEOUS COATING COMPOSITION COMPRISING POLYIMIDE-FORMING REACTANTS

This application is a division of application Ser. No. 124,986, filed Feb. 27, 1980, now U.S. Pat. No. 4,332,708.

CROSS REFERENCE TO RELATED APPLICATIONS

Reference is made to our copending application Ser. No. 960,040, filed Nov. 13, 1978 now U.S. Pat. No. 4,255,471, for Coating Solutions of Polyetherimide Forming Monomers, and Ser. No. 965,192, filed Nov. 30, 1978, now U.S. Pat. No. 4,215,157 for Coating Solutions of Polyetherimide Forming Monomers, assigned to the same assignee as the present invention.

BACKGROUND OF THE INVENTION

As shown in U.S. Pat. No. 4,157,996, assigned to the same assignee as the present invention, a solution of aromatic bis(ether dicarboxylic acid), an organic diamine and a monoalkyl ether of ethylene glycol or diethylene glycol is coated on a substrate and polymerized to form a high quality polymeric film. However, experience has shown that such mixtures often cannot tolerate appreciable amounts of water, for example, above about 1.0% by weight in instances where monoalkyl ether of ethylene glycol or diethylene glycol is utilized as the solvent without precipitation occurring. The wire coating industry is continuously investigating the formulation of wire coating solutions which can utilize inexpensive monoalkyl ethers of ethylene glycol and of diethylene glycol as a principal solvent for high solids enamels in combination with non-precipitating amounts of water, for example, up to about 10% by weight of the mixture to reduce overall manufacturing costs while satisfying environmental requirements and giving improved enamel behavior.

The present invention is based on the discovery that organic dianhydride of the formula,

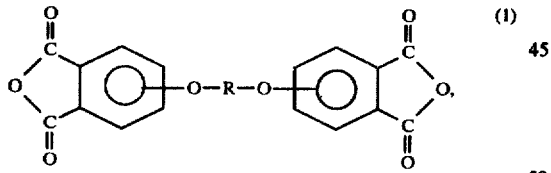

where R is a $C_{(6-30)}$ aromatic organic radical, can be heated with monoalkyl ether of diethylene glycol in the presence of significant amounts of water, for example, as high as 10% by weight of the mixture to produce a clear solution comprising a mixture of the corresponding tetra-acid of the organic dianhydride of formula (1) and the half-ester resulting from the reaction of the monoalkyl glycol ether and the organic dianhydride. There then can be added to the clear solution, at least equal molar amounts and including up to about 25 mole percent excess of organic diamine of the formula,

based on total moles of initial organic dianhydride of formula (1) utilized, where $R^1$ is a $C_{(6-30)}$ organic radical. The resulting formulation can be utilized as a clear, stable wire coating solution which can remain unchanged at ambient temperatures for an indefinite period of time and thereafter used as a coating composition, for example, a wire coating enamel to produce flexible films under conventional wire coating conditions.

STATEMENT OF THE INVENTION

The present invention relates to aqueous coating solutions of monomeric aromatic polycarboxylic acid and polycarboxylic acid half-ester and organic diamine mixtures in monoalkyl ether of ethylene glycol or diethylene glycol. More particularly, the present invention relates to wire coating formulations which are formed by initially heating an in situ formed mixture of an aromatic organic dianhydride, water and a monoalkyl ether of ethylene glycol, which hereinafter will also include diethylene glycol, until a clear solution is obtained, followed by the addition of organic diamine to the resulting mixture.

There is provided by the present invention aqueous solutions comprising by weight (A) from about 40% to 75% solids and
(B) from about 25% to 60% solvent, where (A) is an organic polycarboxylic acid-organic diamine mixture which can be formed in situ as previously described or can be made by directly using preformed tetra-acid or half-ester as shown by formulas (3) and (4) below, and the organic diamine can be present in the organic polycarboxylic acid-organic diamine mixture in about equal molar amounts and up to a 25 mole percent excess of organic diamine as previously defined, where the organic polycarboxylic acid portion of (A) is a member selected from (i) a mixture of 40 to 80 mole percent of tetra-acid of the formula

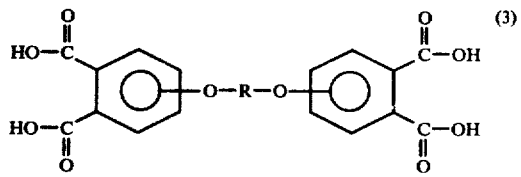

, and 20 to 60 mole percent of a half-ester of the formula,

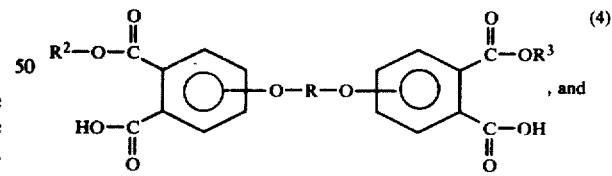

(ii) a mixture consisting essentially of (i), and from 0 to 10 mole percent based on total moles of polycarboxylic acid of formulas (3) and (4) of organic dianhydride of formula (1), where R is as previously defined, $R^2$ is an alkyl terminated alkylene ether or dialkylene ether radical, and $R^3$ is selected from $R^2$ and hydrogen, and the organic diamine portion of said solids mixture comprises organic diamine of formula (2) and where (B) is a solvent mixture comprising by weight 1 to 20% by weight of water and 80 to 99% by weight of monoalkyl ether of ethylene glycol or diethylene glycol having 1 to 4 carbon atoms in the alkyl group.

Radicals included by R of formulas (1), (3) and (4) are, for example,

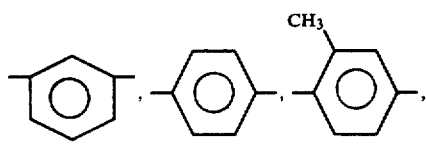

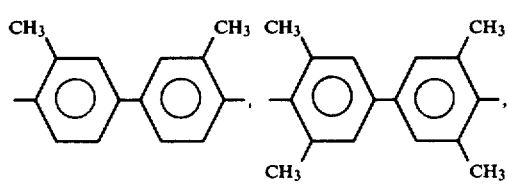

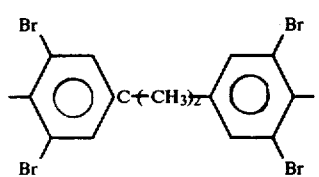

and divalent organic radicals of the general formula,

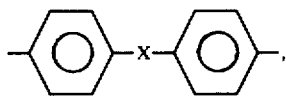

where X is a member selected from the class consisting of divalent radicals of the formulas,

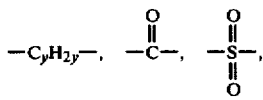

—O— and —S—, where y is an integer from 1 to 5.

Radicals included by $R^1$ of formula (2) are, for example, divalent organic radicals selected from the group consisting of divalent aromatic hydrocarbon radicals having from 6 to 30 carbon atoms and halogenated derivatives thereof, alkylene radicals having from 2 to about 20 carbon atoms, cycloalkylene radicals having from 3 to about 20 carbon atoms, from $C_2$ to about $C_8$ alkylene terminated polydiorganosiloxane, and divalent radicals of the general formula,

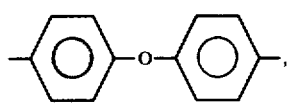

where Q is a member selected from the class consisting of —O—,

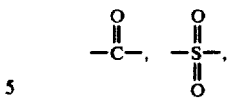

—S— and —$C_xH_{2x}$— and x is an integer equal to 1 to 5.

Radicals included within $R^2$ of formula (4) are, for example, —$CH_2$—$CH_2OR^4$, —$CH_2$—$CH_2$—O—$CH_2CH_2OR^4$, etc., where $R^4$ is selected from methyl, ethyl, propyl, butyl, etc.

Dianhydrides included within formula (1) are, for example, 2,2'-bis[4-(2,3-dicarboxyphendoxy)phenyl]propane dianhydride;

4,4'-bis(2,3-dicarboxyphenoxy)diphenyl ether dianhydride;

1,3-bis(2,3-dicarboxyphenoxy)-benzene dianhydride;

4,4'-bis-(2,3-dicarboxyphenoxy)-diphenyl sulfide dianhydride;

1,4-bis(2,3-dicarboxyphenoxy)-benzene dianhydride;

4,4'-bis(2,3-dicarboxyphenoxy)-diphenyl sulfone dianhydride;

2,2-bis[4-(3,4-dicarboxyphenoxy)-phenyl]propane dianhydride;

(3,4-dicarboxyphenoxy)-diphenyl ether dianhydride;

4,4'-bis(3,4-dicarboxyphenoxy)-diphenylsulfone dianhydride;

1,3-bis(3,4-dicarboxyphenoxy)-benzene dianhydride;

1,4-bis(3,4-dicarboxyphenoxy)-benzene dianhydride;

4,4'-bis(3,4-dicarboxyphenoxy)-diphenylsulfone dianhydride;

4-(2,3-dicarboxyphenoxy-4'-(3,4-dicarboxyphenoxy)-2,2-diphenyl propane dianhydride, etc.

Organic diamines included within formula (2) are, for example,
m-phenylenediamine;
p-phenylenediamine;
4,4'-diaminodiphenylpropane;
4,4-diaminodiphenylmethane;
benzidine;
4,4'-diaminodiphenyl sulfide;
4,4'-diaminodiphenyl sulfone;
4,4'-diaminodiphenyl ether;
1,5-diaminonaphthalene;
3,3'-dimethylbenzidine;
3,3'-dimethoxybenzidine;
2,4-bis(β-amino-t-butyl)toluene;
bis(p-β-amino-t-butylphenyl)ether;
bis(p-β-methyl-o-aminopentyl)benzene;
1,3-diamino-4-isopropylbenzene;
1,2-bis(3-aminopropoxy)ethane;
m-xylylenediamine;
p-xylylenediamine;
2,4-diaminotoluene;
2,6-diaminotoluene;
bis(4-aminocyclohexyl)methane;
3-methylheptamethylenediamine;
4,4'-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;

1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine;
bis-(3-aminopropyl)tetramethyldisiloxane;
bis-(4-aminobutyl)tetramethyldisiloxane; etc.

Monoalkyl ethers of ethylene glycol which can be employed in the practice of the present invention are, for example, monomethyl ether of ethylene glycol, monobutyl ether of ethylene glycol, monobutyl ether of diethylene glycol, monomethyl ether of diethylene glycol, monomethyl ether of triethylene glycol, etc, and mixtures thereof.

In the practice of the invention, a mixture of organic dianhydride, mono alkyl glycol ether and water is heated to a temperature from 70° to 135° C. to dissolve the organic dianhydride and provide for the production of a mixture of organic tetra-acid and half-esters. If desired, a mixture of tetra-acid and preformed di(half-esters) can also be mixed with suitable amounts of water and glycol ether solvent to directly produce an organic tetra-acid-di(half-ester) mixture prior to the addition of the organic diamine. The organic diamine can then be added to the mixture to produce a wire coating formulation. If desired, the mixture can be heated to between 40° to 70° C. to facilitate the solution of the organic diamine.

It has been found that the solution viscosity of the aqueous wire enamel can vary widely between about 200 centistokes to about 200,000 centistokes at 25° C., depending on the solids content. In certain instances, the viscosity may be extremely high requiring extrusion techniques. The mixture once formulated should be kept in closed containers to minimize the absorption of excess water or loss of organic solvent which can cause precipitation of solids if the material balance in the mixture is substantially altered.

By non-aqueous titration with strong base, the orthodiacid derived from an anhydride function can be differentiated from anhydride or half ester, but the latter two species cannot be differentiated from each other. However, residual unconverted anhydride functions will react at room temperature with subsequently added diamine to give polyamic acid species and will consume amine groups in the process. By titration with acid titrant, the disappearance of amine can be determined and equated to equivalents of unreacted anhydride in the system before addition of amine. These methods were used to obtain analytical data given in the examples below.

In order that those skilled in the art will be better able to practice the invention, the following examples are given by way of illustration and not by way of limitation. All parts are by weight.

EXAMPLE 1

A mixture of 276.9 parts of 2,2-bis[4-(3,4-dicarboxyphenoxy)phenyl]propane dianhydride, 213 parts of the methyl ether of diethylene glycol and 53.1 parts of water was heated. After 35 minutes at 93° C., the mixture had become a clear solution. The solution was cooled to room temperature, and 116 parts of methylene dianiline was added. A clear solution was obtained after 45 minutes at a temperature of about 50° C. The viscosity of the solution was 18,200 centistokes at 25° C. and no precipitation was observed after 2 months storage at room temperature. The same procedure was repeated to give a solution of 20,700 centistokes at 25° C. The two solutions were then combined to produce a mixture having 59.6 weight percent of solids, based on the weights of the dianhydride and diamine initially added in the aqueous solvent. There was then added to the solution 125.5 parts of the methyl ether of diethylene glycol to 842.4 parts of the combined solutions resulting in a mixture having 51.9 percent solids, based on the original weight of organic dianhydride and organic diamine utilized. The viscosity of the resulting solution, A, was found to be 1,720 centistokes at 25° C. Analysis of the solution indicated that 66% of the anhydride equivalents had been converted to ortho-diacid and approximately 30% to half-ester groups prior to the addition of the organic diamine. There was also found about 4% of the original organic anhydride equivalents unreacted. The residual water content of the combined reacted mixture prior to dilution with methyl ether of diethylene glycol was 6.1% by weight and after its addition was 5.3% by weight. The final mixture showed no evidence of precipitation after two months storage at room temperature and essentially no change in viscosity.

Another mixture was prepared with 41.3 weight percent of the above organic dianhydride in dry methyl ether of diethylene glycol which was heated from 50° to 130° C. for about 30 minutes resulting in the production of a clear solution. The mixture was then allowed to cool to room temperature and 1,144.1 parts of the solution was mixed with 197.8 parts of methylenedianiline. The resulting mixture was stirred at room temperature for several hours until all of the organic diamine had dissolved to give a clear, light-brown solution. There was obtained a solution, B, having a solids content calculated as dianhydride and diamine of about 50% and a viscosity at 25° C. of 3,306 centistokes. Titration of the mixture indicated that only 56.7 equivalent percent of anhydride groups had been converted to half-ester groups, and that no ortho diacid groups were present.

The above wire coating solutions A and B were then die-coated continuously on 40.8 mil copper wire. Each of the four applied coats were cured at a temperature profile increasing from 250° C. to 412° C. with residence time of 45 seconds for each coat. The results obtained are shown in Table I, where A represents the coating formulations containing water and B represents the coating formulation free of water:

TABLE I

| Properties of Enameled Wire | | |
|---|---|---|
| | A | B |
| Film Thickness, mils | 1.2 | 1.0 |
| Flexibility, 25% stretch + mandrel wind | Pass at 1X wire diameter | Fails at 5X wire diameter |
| Heat Shock, 20% stretch, mandrel wind, + ½ hour at 200° C. | Pass at 3X wire diameter | Fails at 5X wire diameter |
| Cut-Through Temperature | 350° C. | 315° C. |

Additional water-free formulations were prepared utilizing the above organic dianhydride and methyl ether of diethylene glycol and methylenedianiline. In one mixture 171.4 parts of the organic dianhydride and 243.6 parts of the methyl glycol ether was heated from room temperature to 170° C. over a period of one hour to give a clear solution. A 13.3 parts portion of the solution was mixed with 2.3 parts of methylene dianiline and was stirred at room temperature until the diamine had completely dissolved. Potentiometric titration of the solution indicated that the anhydride groups had been converted completely to half-ester functions prior to the addition of the diamine. A film cast and cured from the final anhydrous solution had inferior properties.

EXAMPLE 2

A series of mixures were prepared of the tetra-acid of 2,2-bis[4-(3,4-dicarboxyphenoxy)phenyl]propane dianhydride and the di(half-ester) thereof to determine the effect of the mole ratio of the tetra-acid of the di(half-ester) on cutthrough temperature and flexibility of the resulting film. An additional study was made to determine the critical water content in aqueous methyl ether of diethylene glycol to determine how much water could be tolerated in the mixture before precipitation of the ingredients occurred. Various mixtures of the tetra-acid and the di(half-ester) were prepared from two anhydrous stock solutions containing the methyl ether of diethylene glycol. One stock solution, which was prepared by dissolving pure tetra-acid solid in anhydrous methyl ether of diethylene glycol, contained 44.15% of the tetra-acid. A second stock solution free of tetra-acid was prepared by heating 171.4 parts of the dianhydride and 243.6 parts of anhydrous methyl diethylene glycol ether from room temperature to 170° C. over a period of 1 hour. Methylene dianiline was added to each of the mixtures to give compositions in which the equivalents of amine groups was 10% in excess of the sum of equivalents of o-diacid groups and half-ester groups. Water was then added to each of these mixtures containing diamine and anhydride derived functions, to determine the amount of water that could be tolerated without formation of haze, solid precipitate, or two liquid phases. Films were cast on aluminum from these various solutions and were cured sequentially for 5 minutes at 150° C., 10 minutes at 200° C., 5 minutes at 250° C. and 10 minutes at 300° C. The properties of the cured films showing the effect of the mole ratio of the tetra-acid to the di(half-ester) content with respect to cut-through temperature and flexibility is shown in Table II below:

TABLE II

| Mole Ratio tetra-acid/ Di(half-ester) | Properties of Cured Films[a] | |
|---|---|---|
|  | Cut Through Temp. °C. | Flexibility Bend and Crease |
| 0/100 | 267 | cracked |
| 20/80 | 270 | cracked |
| 40/60 | 280 | OK |
| 50/50 | 290 | OK |
| 60/40 | 300 | OK |
| 100/0 | 293 | OK |
| 66/34, Ex. 1 | 305 | OK |

[a]films cast on aluminum foil, cured sequentially for 5'150° C., 10'200° C., 5'250° C., 10'300° C. All compositions contained methylene dianiline in 10 mole % excess over the sum of dianhydride derived species.

With respect to the critical water content of the above described polycarboxylic acid-organic diamine mixture, water was added to each of the mixtures containing diamine and dianhydride-derived functions and the amount of water which could be tolerated without formation of haze, solid precipitate, or two liquid phases was determined as shown in Table III below:

TABLE III

| Mole Ratio tetra-acid/ Di(half-ester) | Solids[a] Content Wt. % | Tolerated water, wt. %[b] | |
|---|---|---|---|
|  |  | Total mixture | Solvent mixture |
| 0/100 | 39.9 | ~19 | 31.6 |
| 20/80 | 38.0 | ~19 | 30.6 |
| 40/60 | 46.7 | 6.6 | 12.4 |
| 50/50 | 47.8 | 4.5 | 8.6 |
| 60/40 | 48.1 | 4.0 | 7.7 |
| 80/20 | 49.0 | 2.0 | 3.9 |
| 100/0 | 49.0 | 1.5 | 2.9 |
| 66/34, Example 1 | 60.0 | >6.1 | >15.3 |

[a]Calculated on the basis of the dianhydride precursor, and with methylene dianiline in 10 mole % excess.
[b]Clear solution for longer than 3 days at room temperature.

Table II above shows that mixtures of 40 to 100 mole percent of the tetra-acid and 0 to 60% of the di(half-ester) provide the best films with respect to cut-through temperature and flexibility. Table III shows that weight percent water tolerated without causing precipitation is severely restricted in formulations containing tetra-acid species only and the tolerable water content increases with increasing mole ratios of di(half-ester) species.

EXAMPLE 3

Compositions containing the organic dianhydride and various water/glycol ether or water-diethylene glycol ether mixtures were heated at approximately 95° C. until the solutions became clear. Aliquot portions of each solution were then withdrawn and methylene dianiline in amount calculated to be at 10 mole percent excess of the initial dianhydride content was added to each solution. The compositions were analyzed by titration for residual anhydride groups, ortho diacid groups and half-ester groups. The compositions were then stored at room temperature and were examined periodically for presence of haze or precipitate. These data are given in Table IV. By similar procedures, analyses were carried out on aliquot portions of the various mixtures that had been heated at 95° C. for additional time after the solutions had become clear. Titration for functional groups showed that very little change in distribution of carboxylic species were produced by the subsequent heating beyond the time at which the solutions had become clear, where 4,4'-BPADA is the same organic dianhydride as used in Example 1 and MDA is methylene dianiline.

TABLE IV

| Enamel Compositions Prepared by the In Situ Procedure | | | | | |
|---|---|---|---|---|---|
| Initial Composition, wt. % | | | | | |
| 4,4'BPADA | 53.6 | 51.0 | 46.4 | 51.0 | 51.0 |
| organic solvent* | 41.2 | 39.2 | 35.7 | 39.2 | 39.2 |
|  | (DM) | (DM) | (DM) | (DB) | (EM) |
| water | 5.2 | 9.8 | 17.9 | 9.8 | 9.8 |
| Hours at 95° C. to give clear solution | 4.2 | 2.7 | 2.5 | 4.0 | 2.3 |

TABLE IV-continued

| Enamel Compositions Prepared by the In Situ Procedure | | | | | |
|---|---|---|---|---|---|
| Conversion of anhydride groups, equiv. % | | | | | |
| ortho diacid | 56 | 65 | 73 | 68 | 64 |
| half-ester | 25 | 31 | 23 | 24 | 28 |
| residual anhydride | 19 | 4 | 4 | 8 | 8 |
| Final composition containing MDA** | | | | | |
| solids content, wt. % | 62 | 60 | 56 | 60 | 60 |
| water content, wt. % | 2.5 | 6.2 | 13 | 6.2 | 6.2 |
| viscosity, C.S. at 25° C. | $10^5$ | $2 \times 10^4$ | — | — | — |
| retention of clarity, days | >30 | >30 | 1 | >30 | 18 |

*DM - monomethyl ether of diethylene glycol
DB - monobutyl ether of diethylene glycol
EM - monomethyl ether of ethylene glycol
**MDA at 10 mole % excess based on moles of initial dianhydride Although the above examples are directed to only a few of the very many variables of the present invention, it should be understood that the present invention is directed to an in situ method of making wire enamel compositions based on the reaction of organic dianhydride of formula (1), water, and monoalkyl ether of ethylene glycol or diethylene glycol, followed by the addition of organic diamine of formula (2) and compositions produced by such method.

The coating compositions of the present invention also can be used as varnishes, impregnating resins, laminating resins, protective coatings and primer coatings on metal, etc. The method of making such compositions is more particularly achieved by (1) heating a mixture of an organic dianhydride of formula (1), monoalkyl ether of ethylene glycol or diethylene glycol and water at a temperature of 70° C. to 135° C. where there is utilized in the mixture from about 0.35 to about 2.5 parts of monoalkyl glycol ether and about 0.05 to about 0.4 parts of water, per part of dianhydride, to form a clear solution, (2) adding to the solution of (1) about an equal molar amount and up to a 25 mole percent excess, based on moles of organic dianhydride of (1) of an organic diamine of formula (2).

What we claim as new and desire to secure by Letters Patent of the United States is:

1. A method for making a wire coating composition in the form of a stable aqueous solution comprising (1) heating a mixture of an organic dianhydride of the formula,

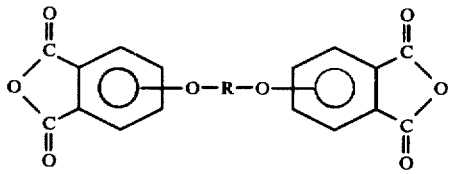

monoalkyl ether of ethylene glycol or diethylene glycol and water at a temperature of 70° C. to 135° C. where there is utilized in the mixture from about 0.35 to about 2.5 parts of monoalkyl glycol ether and about 0.05 to about 0.4 part of water, per part of dianhydride, to form a clear solution, (2) adding to the solution of (1) about an equal molar amount and up to 25 mole percent excess, based on moles of organic dianhydride of (1), and organic diamine of the formula, $H_2NR^1NH_2$, where R is a $C_{(6-30)}$ aromatic organic radical and $R^1$ is a $C_{(6-30)}$ organic radical.

2. A method in accordance with claim 1, where the organic dianhydride is 2,2-bis[4-(3,4-dicarboxyphenoxy)phenyl]propane dianhydride.

3. A method in accordance with claim 1, where the organic diamine is methylene dianiline.

4. A method in accordance with claim 1, where the organic diamine is oxydianiline.

5. A method in accordance with claim 1, where the organic diamine is metaphenylenediamine.

6. A method in accordance with claim 1, where the monoalkyl glycol ether is the methyl ether of diethylene glycol.

7. A method in accordance with claim 1, where a mixture of monoalkyl glycol ether is utilized.

* * * * *